Patented June 20, 1933

1,914,404

UNITED STATES PATENT OFFICE

THOMAS JOHN IRELAND CRAIG, OF MANCHESTER, ENGLAND, ASSIGNOR TO PETER SPENCE & SONS, LIMITED, OF MANCHESTER, ENGLAND

TREATMENT OF LEUCITE AND LIKE MINERALS

No Drawing. Application filed June 27, 1927, Serial No. 201,965, and in Great Britain June 29, 1926.

This invention has reference to the treatment of leucite and like minerals containing aluminium and potassium oxides in a form soluble in nitric acid, for the production of aluminium nitrate and potassium nitrate, if desired in a state of high purity, and from which other compounds may be prepared.

It is known that nitric acid readily attacks leucite and similar minerals, producing a solution of aluminium nitrate and potassium nitrate containing also as impurities iron nitrate and small amounts of other nitrates. It is also known that a mixture of aluminium and potassium nitrates obtained in the solid form by evaporating and crystallizing such a solution may be treated with nitric acid to dissolve the potassium nitrate and leave the aluminium nitrate undissolved. It is further known that a solution obtained from leucite by attacking it with nitric acid containing added potassium nitrate may be evaporated and potassium nitrate crystallized out from it at or about ordinary temperatures. In the specification of British Patent No. 230,045 it is stated that the solution obtained by dissolving leucite with nitric acid does not yield potassium nitrate crystals on cooling, but a crystal mixture of potassium nitrate and aluminium nitrate. A process has been described for removing iron from aluminium nitrate solutions by rendering the solutions basic and with or without addition of ferric oxide heating them to precipitate the iron in the form of oxide. It is also known that when a solution of aluminium nitrate is dried and ignited alumina and nitrogen oxides are produced.

Now I have found that I may obtain from a solution of mixed nitrates of aluminium and potassium in the proportions substantially resulting from digestion of leucite and like minerals with nitric acid, and also from the solutions of mixed nitrates as obtained when operating in a cyclic way as afterwards indicated, a large proportion of the potassium nitrate in the crystalline form unmixed with crystals of aluminium nitrate.

According to my invention leucite and like minerals are digested with nitric acid to produce a neutral or nearly neutral solution which, after clarifying if necessary, is cooled to such a degree, varying according to the strength and acidity or otherwise of the solution, that while the aluminium nitrate remains in solution a large proportion of the potassium nitrate crystallizes out and is separated; the liquor is then treated with nitric acid and again cooled whereby aluminium nitrate crystallizes out and is separated and the acid mother liquor is preferably afterwards used again for digesting another batch of the mineral, thus completing a cycle of operations. The invention also comprises the interposition in the process of a step consisting in the purification of the nitrate solution from iron usually contained therein, and certain methods whereby such purification may be effected, thus allowing of the production of aluminium nitrate practically free from iron and from which by drying and/or heating I may obtain highly pure alumina, the evolved nitrogen oxides being recovered for re-use by known means, or from which nitric acid and other compounds of aluminium may be obtained.

By treating leucite and like minerals with nitric acid and nitrate liquors recovered from previous operations, I can obtain neutral or nearly neutral solutions from which without employing concentration and by merely cooling, I can directly and in one operation crystallize out in a practically pure condition the proportion of the total potassium nitrate substantially equivalent to that introduced from the mineral treated in the cycle of operations. I am also able to remove from the nitrate solutions preferably before crystallizing out the potassium nitrate although I may remove it after crystallizing out potassium nitrate if desired practically all the iron by precipitating it as basic ferric potassium sulphate. I prefer to carry out such precipitation in a neutral or basic solution under agitation in the presence of some suitable finely divided insoluble substance e. g. finely ground leucite residue which appears to act as an excitant, at an elevated temperature, and it is essential that sufficient sulphate must be present in solution, suitably added as aluminium or potassium sulphate. Or I may remove the iron by addition of a suitable hydrated oxide of manganese, of tin or antimony in suitable form to the said nitrate solutions and agitating for a suitable time.

From the liquor remaining after the crystallization and removal of potassium nitrate I may now obtain nearly all of the aluminium nitrate in a pure form by crystallizing it out by addition of nitric acid at suitable strength, and at suitable temperature, the crystallized aluminium nitrate being separated from the acid mother liquor by known means. If the amount of iron in solution is not reduced to very low proportions I find that it is impracticable to obtain the aluminium nitrate in a sufficiently pure condition to be employed for the preparation therefrom of alumina or other compounds in commercially pure form. The highly acid mother liquors are suitable for use in attacking fresh mineral in the manner hereinafter indicated.

In carrying my invention into effect I may digest the mineral with nitric acid in a single suitable vessel, but usually I prefer to operate in a systematic and progressive manner according to the contracurrent principle in two or more vessels in which the most exhausted mineral is digested with the least neutralized solution and vice versa, the fully extracted mineral being afterwards systematically washed with progressively weaker wash liquors from previous operations and finally with water. By these means I am able to obtain e. g., from the digestion of leucite in a granular form, a solution containing little or no uncombined nitric acid and a well extracted residue.

The said neutral or nearly neutral liquor or the same liquor after rendering it basic, if desired, and after clarifying, if necessary, which, together with the first strong wash liquor may readily be obtained of at least the minimum strength necessary for the desired separation, is now without further treatment cooled and crystallized at such temperatures as will for the conditions of strength and composition allow the crystallization of potassium nitrate free or practically free from aluminium nitrate. When the process has been operated sufficiently to get into the regular sequence of operations as later described, it will be found possible to obtain by this crystallizing operation the whole or practically the whole of the potassium nitrate which is introduced into the system in each cycle of operations by attack on a fresh batch of mineral. The temperature to which the liquor may be cooled to crystallize out potassium nitrate without admixture or combination with aluminium nitrate may vary with the concentration of the liquor and its composition. The potassium nitrate substantially free from aluminium nitrate may be systematically washed and dried or otherwise suitably dealt with to bring it to merchantable form.

The mother liquor from the potassium nitrate is now treated with strong nitric acid sufficient to bring about the crystallization of practically all the aluminium nitrate which is separated by known means and systematically washed, suitably first with nitric acid solutions which have been previously used for such purpose and finally with fresh nitric acid. The nitric acid after it has been used several times for such washing may very suitably be employed in the digestion of the mineral, and the quantity eliminated from such washing, together with that contained in the aluminium nitrate mother liquor per cycle of operations is not more than must necessarily be introduced for digestion of the mineral per cycle.

I prefer to purify the nitrate solutions from iron before crystallizing the potassium nitrate. If I desire to remove it as basic ferric potassium sulphate I prefer to make the liquor somewhat basic by e. g., evaporating off some of its nitric acid or by the addition of alumina i. e. precipitated aluminium hydrate or potash i. e. potassium hydroxide or potassium carbonate in a suitable soluble form, and carry out the purification under conditions hereinbefore indicated, the precipitated and insoluble matter being afterwards removed by any suitable known means. Or I may treat the preferably basic liquor with a suitable hydrated oxide of manganese or of tin or of antimony in suitable form which takes up nearly all the iron oxide in the ferric condition and removes it from solution. After the iron has been removed or largely removed from the liquor the latter is dealt with as already described for the recovery of potassium nitrate, if this has not been crystallized out already, and for the recovery of practically iron free aluminium nitrate.

In some cases, e. g. in order to obtain a rapid crystallization of the potassium nitrate, I may cool the liquor to temperatures below those at which aluminium nitrate separates in addition to potassium nitrate and then suitably raise the temperature of the liquor again to re-dissolve any aluminium nitrate which may have crystallized out.

I find that I may also remove aluminium nitrate which has crystallized out in admixture with potassium nitrate by treating the mixed crystals in the cold or at somewhat elevated temperatures with a saturated solution of potassium nitrate which dissolves out the aluminium nitrate leaving substantially pure potassium nitrate.

Broadly, when treating more acid solutions of the mixed nitrates, produced e. g., by direct attack of nitric acid on leucite, I find that when operating at such strengths as will allow the process to be worked in the manner described without the necessity for evaporating the liquor, the separation of aluminium nitrate tends to take place at about the same temperature, or above, as that of potassium nitrate. With less acid liquor the tendency is for the separation of potassium nitrate to take place first, but with less difference between the temperatures at which each salt is separated from solution than in the case of neutral or basic liquors. With neutral liquors the difference between the temperatures at which the two salts separate from solution is considerable, the potassium nitrate coming out first and in basic liquors the temperature difference is still more marked. As stated, the temperatures at which the desired separation of the two salts may be effected will vary according to the composition of the liquors and their specific gravity, but as indication of the conditions under which such separation may be affected by variation in such composition as far as acidity is concerned the following results may be given. With a liquor basic to the extent of about 1.7 grams free alumina per 100 c. c. and of about 1.52 sp. gr. at 80° C. and containing potash and alumina approximately in the ratio in which they exist in the mineral leucite, the temperature at which, on cooling, the potassium nitrate commenced to form was about 45° C., and the temperature at which aluminum nitrate first commenced to separate was about 25° C. With liquor of a specific gravity of about 1.53 at 80° C. containing about 1.25 grams free nitric acid per 100 c. c. and with a ratio of potash to alumina as in the previous example the temperature at which, on cooling, potassium nitrate commenced to crystallize was about 34° C., and that at which aluminium nitrate first began to crystallize out was about 30° C.

What I claim as my invention and desire to secure by Letters Patent is:—

1. The process of separating potassium nitrate and aluminium nitrate from leucite and like minerals which comprises treating the mineral with a nitric acid liquor to produce a substantially neutral solution, rendering the solution basic, cooling the solution to crystallize the potassium nitrate, removing the potassium nitrate crystals, treating the remaining solution with a nitric acid liquor, cooling the solution to crystallize the aluminium nitrate and removing the latter crystals from the solution.

2. The process of separating potassium nitrate and aluminium nitrate from leucite and like minerals which comprises treating the mineral with a nitric acid liquor to produce a substantially neutral solution, removing the iron, rendering the solution basic, cooling the solution to crystallize the potassium nitrate, removing the potassium nitrate crystals, treating the remaining solution with a nitric acid liquor, cooling the solution to crystallize the aluminium nitrate and removing the latter crystals from the solution.

3. The process of separating potassium nitrate and aluminium nitrate from leucite and like minerals which comprises treating the mineral with nitric acid liquor, rendering the solution basic by the addition of potassium hydroxide, cooling the solution to crystallize the potassium nitrate, removing the potassium nitrate crystals, treating the remaining solution with a nitric acid liquor, cooling the solution to crystallize the aluminium nitrate and removing the latter crystals from the solution.

4. The process of separating potassium nitrate and aluminium nitrate from leucite and like minerals which comprises treating the mineral with nitric acid liquor, adding alumina in excess of the amount required to neutralize the solution, cooling the solution to crystallize the potassium nitrate, removing the potassium nitrate crystals, treating the remaining solution with a nitric acid liquor, cooling the solution to crystallize the aluminium nitrate and removing the latter crystals from the solution.

5. The process of separating potassium nitrate and aluminium nitrate from leucite and like minerals which comprises treating the mineral with a nitric acid liquor, removing the iron from the solution by the addition of a suitable sulphate, rendering the solution basic, cooling the solution to crystallize the potassium nitrate, removing the potassium nitrate crystals, treating the remaining solution with a nitric acid liquor, cooling the solution to crystallize the aluminium nitrate and removing the latter crystals from the solution.

6. The process of separating potassium nitrate and aluminium nitrate from leucite and like minerals which comprises treating the mineral with a nitric acid liquor, precipitating the iron from the solution, rendering the solution basic, cooling the solution to crystallize the potassium nitrate, removing the potassium nitrate crystals, treating the remaining solution with a nitric acid liquor, cooling the solution to crystallize the aluminium nitrate and removing the latter crystals from the solution.

In witness whereof I have hereunto set my hand.

THOMAS JOHN IRELAND CRAIG.